United States Patent Office 2,754,329
Patented July 10, 1956

2,754,329
PROCESS FOR THE RECOVERY OF DIMETHYL NITROSAMINE FROM ITS AQUEOUS SOLUTIONS

Leslie A. Bashford, Coventry, England, assignor to Courtaulds Limited, London, England, a British company No Drawing. Application September 15, 1953, Serial No. 380,360

Claims priority, application Great Britain October 17, 1952

3 Claims. (Cl. 260—583)

This invention relates to the recovery of dimethyl nitrosamine from its aqueous solutions.

It has previously been proposed to dissolve high polymers such as polyacrylonitrile and copolymers containing polyacrylonitrile in nitrosamine compounds including dimethyl nitrosamine, see the abstract of the I. G. Farbenindustrie German patent application J75388 IVc on page 396 of the "Auszüge Deutsches Patent-Anmeldungen," volume 13 (Textilindustrie) published by the Control Commission for Germany, in 1948. This German application states that such solutions can be dry spun or wet spun for example into aqueous methanol or methanol.

Dimethyl nitrosamine is miscible with water in all proportions and as described in copending British applications Nos. 30,053/52 and 1,077/53, (U. S. application, Serial No. 393,942) aqueous solutions of salts such as potassium acetate, calcium chloride, sodium acetate and zinc chloride can be used as a coagulating bath for dimethyl nitrosamine solutions of acrylonitrile copolymers.

The object of the present invention is to provide an economic process for the recovery of dimethyl nitrosamine from its aqueous solutions such as are produced by spinning dimethyl nitrosamine solutions of acrylonitrile polymers and copolymers into aqueous coagulating baths.

In accordance with the present invention, halogenated aliphatic hydrocarbons are used as extractive solvents for dimethyl nitrosamine in aqueous solutions. Examples of suitable halogenated aliphatic hydrocarbons are methylene chloride, chloroform, trichlorethylene, ethylene chloride and dichlorethylene. Mixtures of such compounds may also be used.

The process of this invention can be used for recovering dimethyl nitrosamine from its solutions in water, aqueous alcohol, or aqueous salt solutions such as are obtained by spinning dimethyl nitrosamine solutions of polyacrylonitrile or acrylonitrile copolymers in accordance with the process described in the said British applications Nos. 30,053/52 and 1,077/53. With 15 per cent solutions of dimethyl nitrosamine in 17½ per cent aqueous calcium chloride solution, the partition coefficients of examples of extraction solvents in accordance with this invention are as follows:

| | |
|---|---|
| Methylene chloride | 4.73 |
| Chloroform | 4.76 |
| Trichlorethylene | 1.06 |
| Ethylene chloride | 3.00 |
| Dichlorethylene | 2.27 |

The partition coefficients for methylene chloride and chloroform remain substantially unaltered down to a dimethyl nitrosamine concentration of as low as 0.1 per cent.

For 15 per cent solutions of dimethyl nitrosamine in water alone the partition coefficient for methylene chloride is 3.58 and for chloroform 3.50.

The invention is illustrated by the following examples:

Example 1

1 volume of a 17½ per cent by weight aqueous calcium chloride solution containing approximately 15 g./100 ml. of dimethyl nitrosamine was shaken with 1 volume of methylene chloride in a separating funnel, at room temperature (20° C.) for five minutes and the whole allowed to stand and separate into two layers. The lower methylene chloride layer was withdrawn completely. Analysis of this lower layer showed that it contained 11.0 g./100 ml. of dimethyl nitrosamine. Analysis of the residual calcium chloride solution in the separating funnel showed that its dimethyl nitrosamine concentration had been reduced to 2.3 g./100 ml. A further extraction with 1 volume of methylene chloride in the same manner reduced the dimethyl nitrosamine concentration in the calcium chloride solution to 0.39 g./100 ml., and a third extraction with 1 volume of methylene chloride reduced this figure to 0.07 g./100 ml. The combined methylene chloride extracts were subjected to fractional distillation, when after removal of the methylene chloride substantially the whole of the dimethyl nitrosamine in the original solution was recovered in a pure form.

Example 2

1 volume of a 17½ per cent by weight calcium chloride solution containing approximately 8 g./100 ml. of dimethyl nitrosamine was extracted with three successive 1 volume portions of chloroform as described in Example 1. The dimethyl nitrosamine concentrations in the residual calcium chloride solutions were:

| | G./100 ml. |
|---|---|
| After first extraction | 1.4 |
| After second extraction | 0.25 |
| After third extraction | 0.05 |

The combined chloroform extracts were fractionally distilled as in Example 1 when substantially the whole of the dimethyl nitrosamine in the original solution was recovered in a pure form.

Example 3

1 volume of an aqueous solution containing 15 g./100 ml. of dimethyl nitrosamine was extracted with three successive 1 volume portions of methylene chloride in the manner described in Example 1. The dimethyl nitrosamine concentrations in the residual aqueous solutions were:

| | G./100 ml. |
|---|---|
| After first extraction | 3.1 |
| After second extraction | 0.65 |
| After third extraction | 0.17 |

By fractional distillation of the combined methylene chloride extracts substantially the whole of the dimethyl nitrosamine in the original solution was recovered in a pure form.

What I claim is:

1. A process for the recovery of dimethyl nitrosamine from its aqueous solutions which comprises extracting the dimethyl nitrosamine with an extraction solvent selected from the group consisting of methylene chloride, chloroform, ethylene chloride, dichlorethylene and mixtures thereof and separating the dimethyl nitrosamine from the extracted solution by fractional distillation.

2. A process for the recovery of dimethyl nitrosamine from its aqueous solutions which comprises extracting the dimethyl nitrosamine with methylene chloride and separating the dimethyl nitrosamine from the extracted methylene chloride solution by fractional distillation.

3. A process for the recovery of dimethyl nitrosamine from its aqueous solutions which comprises extracting the dimethyl nitrosamine with chloroform and separating the dimethyl nitrosamine from the extracted chloroform solution by fractional distillation.

References Cited in the file of this patent

Hodgman: "Handbook of Chem. and Physics" (1949), 31st ed., pp. 802–3.
McArdle: "Use of Solvents" (1925), pp. 129–30.
Brown et al.: "Unit Operations" (1950), pp. 297–302.